(12) United States Patent
Howell et al.

(10) Patent No.: US 12,428,139 B2
(45) Date of Patent: Sep. 30, 2025

(54) AIRCRAFT LANDING EVENT SYSTEM AND METHOD

(71) Applicants: Airbus Operations Limited, Bristol (GB); Airbus (SAS), Blagnac (FR)

(72) Inventors: George Howell, Bristol (GB); Andrea Laruelo-Fernandez, Blagnac (FR)

(73) Assignees: AIRBUS OPERATIONS LIMITED, Bristol (GB); AIRBUS (S.A.S.), Blagnac (FR)

( * ) Notice: Subject to any disclaimer, the term of this patent is extended or adjusted under 35 U.S.C. 154(b) by 246 days.

(21) Appl. No.: 17/731,768

(22) Filed: Apr. 28, 2022

(65) Prior Publication Data
US 2022/0348317 A1    Nov. 3, 2022

(30) Foreign Application Priority Data
Apr. 29, 2021  (GB) ...................................... 2106173

(51) Int. Cl.
*B64C 25/42*  (2006.01)
*B64D 43/00*  (2006.01)
*B64D 45/08*  (2006.01)

(52) U.S. Cl.
CPC ............ *B64C 25/426* (2013.01); *B64D 43/00* (2013.01); *B64D 45/08* (2013.01)

(58) Field of Classification Search
None
See application file for complete search history.

(56) References Cited

U.S. PATENT DOCUMENTS

| | | | | |
|---|---|---|---|---|
| 8,355,831 B2* | 1/2013 | Villaume | ............ | G05D 1/0083 |
| | | | | 701/16 |
| 8,428,795 B2* | 4/2013 | Caule | ................... | G08G 5/0021 |
| | | | | 701/16 |
| 9,663,223 B1 | 5/2017 | Harrison et al. | | |

(Continued)

FOREIGN PATENT DOCUMENTS

| | | | | |
|---|---|---|---|---|
| EP | 1 884 462 | | 2/2008 | |
| FR | 3017464 A1 * | | 8/2015 | ............ B60T 8/1703 |

OTHER PUBLICATIONS

"FSF ALAR Briefing Note 8.3—Landing Distances", Flight Safety Digest (Aug.-Nov. 2000), 167-171 (Year: 2000).*

(Continued)

*Primary Examiner* — Navid Z. Mehdizadeh
*Assistant Examiner* — Sarah A. Mueller
(74) *Attorney, Agent, or Firm* — Nixon & Vanderhye P.C.

(57) ABSTRACT

An aircraft landing event system including a processor communicatively coupled with memory storing aircraft landing event data. The processor is configured to receive environment information representative of an environmental condition of a runway approached by an aircraft and receive retardation information representative of a retardation demand of the aircraft during an anticipated landing event of the aircraft on the runway. The processor is further configured to select aircraft landing event data from the memory based on the environment information and the retardation information and determine a performance indicator for the landing event based on the aircraft landing event data selected by the processor. The processor is further configured to communicate the performance indicator to a landing system of the aircraft.

17 Claims, 3 Drawing Sheets

(56) References Cited

U.S. PATENT DOCUMENTS

| | | |
|---|---|---|
| 9,701,401 B2 | 7/2017 | Raby et al. |
| 10,293,924 B2 * | 5/2019 | Le-Bouedec .......... G08G 5/025 |
| 10,319,237 B1 | 6/2019 | Schwartz et al. |
| 10,930,163 B2 * | 2/2021 | Kanagarajan .......... G08G 5/025 |
| 11,545,037 B2 * | 1/2023 | Byxbe ................... B64D 45/08 |
| 2009/0292483 A1 | 11/2009 | Journade et al. |
| 2016/0140854 A1 | 5/2016 | Enns et al. |
| 2019/0112073 A1 * | 4/2019 | Prasanna ................. G08G 5/02 |
| 2019/0251852 A1 | 8/2019 | Moll |
| 2020/0168108 A1 * | 5/2020 | Letsu-Dake ......... G08G 5/0013 |
| 2020/0180781 A1 | 6/2020 | Mckeown et al. |
| 2024/0343234 A1 * | 10/2024 | Hosamani ............. B64C 25/426 |

OTHER PUBLICATIONS

Machine translation of Marceau et al. (FR3017464A1) (Year: 2015).*
Lv, Hao, et al., "A Novel Method of Overrun Risk Measurement and Assessment Using Large Scale QAR Data", Mar. 29, 2018, IEEE Fourth International Conference on Big Data Computing Service and Applications, pp. 213-220 (Year: 2018).*
European Patent Office Examination Report (Jun. 13, 2023)(6 pages).

* cited by examiner

AIRCRAFT LANDING EVENT SYSTEM AND METHOD

RELATED APPLICATION

This application incorporates by reference and claims priority to United Kingdom Patent Application GB 2106173.4, filed Apr. 29, 2021.

TECHNICAL FIELD

The present invention relates to aircraft systems, specifically aircraft landing event systems, to aircraft comprising aircraft systems, and to methods of determining performance indicators.

BACKGROUND

Landing distance calculations are typically performed by flight crew of an aircraft prior to a landing event on a runway. In some examples, the landing distance calculation accounts for a state of the runway as reported by ground crew, such as received from an air traffic control tower. The state of the runway is reported as, for example, "dry" or "wet". A multiplication factor corresponding to the state of the runway is then used to calculate the landing distance.

SUMMARY

A first aspect of the present invention provides an aircraft landing event system comprising a processor communicatively coupled with memory storing aircraft landing event data, the processor configured to: receive environment information representative of an environmental condition of a runway approached by an aircraft; receive retardation information representative of a retardation demand of the aircraft during an anticipated landing event of the aircraft on the runway; select aircraft landing event data from the memory on the basis of the environment information and the retardation information; determine a performance indicator for the landing event on the basis of the aircraft landing event data selected by the processor; and communicate the performance indicator to a landing system of the aircraft.

By using the aircraft performance information selected by the processor, it may be possible to avoid making conservative assumptions about a state of the aircraft when determining the performance indicator. That is, the performance indicator may be more accurate, and/or more representative of the state of the aircraft for the anticipated landing event.

Optionally, the processor is configured to cause the performance factor to be stored in the memory.

Optionally, the performance indicator is a landing distance factor to be applied to a landing distance calculation.

Optionally, the landing distance factor is a multiplication factor. In this way, a landing distance of the anticipated landing event may be more accurately determined on the basis of the landing distance factor.

Optionally, the processor is configured to determine a landing distance of the aircraft during the anticipated landing event on the basis of the performance indicator.

Optionally, the landing distance is a distance required for the aircraft to slow to a taxiing speed from a touchdown of the aircraft on the runway. Optionally, the landing distance is any other suitable measure of a landing distance.

Optionally, the processor is configured to communicate the landing distance to the aircraft landing system instead of, or as well as, the performance indicator.

Optionally, the aircraft landing system comprises a flight deck element, such as a flight deck display, and the processor is configured to communicate the performance indicator and/or the landing distance to the flight deck element. This may provide flight crew of the aircraft, and/or an autopilot of the aircraft, with an indication of, and/or an opportunity to take action on the basis of, the performance indicator and/or the landing distance associated with the anticipated landing event of the aircraft on the runway. For example, the flight crew or autopilot may decide to cause the aircraft to touchdown later on the runway, which may reduce fuel burn and/or noise pollution of the aircraft 10, or may choose to land the aircraft on a different runway.

Optionally, the aircraft landing event data stored in the memory comprises, for each landing event, an environmental condition, a retardation demand, and a performance indicator.

That is, the aircraft landing event data comprises the same retardation information and environment information for previous landing events as that the received by the processor for the anticipated landing event. The aircraft landing event data also comprises a performance indicator, such as a landing distance factor, associated with each of the previous landing events. In this way, the performance indicator and/or landing distance for the upcoming landing event may be determined more accurately on the basis of the selected aircraft landing event data.

Optionally, the processor is configured to select aircraft landing event data comprising environmental conditions and retardation demands that correspond to, and/or that are similar to, the respective environmental conditions and retardation demands of the anticipated landing event. By using aircraft landing event data of previous landing events that are similar to the anticipated landing event, the performance indicator may be more accurately determined.

Optionally, the aircraft landing event data stored in the memory comprises landing event data of the aircraft and landing event data of other aircraft.

That is, aircraft landing event data of previous landing events of the aircraft, as well as previous landing events of other aircraft, is stored in the memory. Optionally, the aircraft landing event data comprises landing event data of landing events on the runway being approached by the aircraft and/or landing event data of landing events on other runways. In this way, a more accurate determination of the typical performance of the aircraft and/or other aircraft on the runway being approached by the aircraft and/or other runways may be made. This may lead to a more accurate determination of the performance indicator and/or landing distance for the anticipated, or upcoming, landing event.

Optionally, the processor is configured to determine a relationship between performance indicators and both environment conditions and retardation demands of the aircraft landing event data selected by the processor.

Optionally, the processor is configured to determine the performance indicator for the anticipated landing event on the basis of the relationship. That is, based on the aircraft landing event data selected by the processor, the processor is configured to determine a typical relationship between performance indicators and both environment conditions and retardation demands that are similar to those represented by the environment information and retardation information received by the processor.

Optionally, the relationship comprises one or more regression models of performance indicators as a function of environmental conditions and retardation demands that correspond to those of the anticipated landing event. In this way, the performance indicator and/or landing distance for the anticipated landing event may be more accurately determined on the basis of a typical performance of the aircraft and/or other aircraft, under similar environmental conditions and retardation demands.

Optionally, the processor is configured to determine a performance factor of the approaching aircraft by comparing the landing event data of the aircraft with the landing event data of the other aircraft, as selected by processor.

Optionally, the processor is configured to determine the performance indicator for the landing event on the basis of the performance factor. In this way, the performance indicator may take into account a typical performance of the aircraft compared to other aircraft, thereby more accurately accounting for a current state, or bias, of the aircraft compared to the other aircraft, for the particular environmental conditions and retardation demands of the anticipated landing event.

Optionally, the aircraft landing event data selected by the processor comprises, for each landing event of the aircraft and other aircraft, a landing distance of that landing event. Optionally, to determine the performance factor, the processor is configured to determine, on the basis of the aircraft landing event data, a statistical distribution of the landing distances for the landing events of aircraft other than the aircraft.

Optionally, to determine the performance factor, the processor is configured to determine an average landing distance on the basis of the distribution. Optionally, the processor is configured to determine an average, or typical, landing distance of the current aircraft based on the landing event data selected by the processor. Optionally, the comparing the landing event data of the aircraft with that of the other aircraft by the processor comprises comparing, such as determining a difference or ratio between, the typical landing distance of the current aircraft and the average landing distance of the other aircraft. Optionally, the performance factor is the difference, or ratio determined by the processor.

Optionally, the processor is configured to determine the performance indicator for the landing event on the basis of the performance factor and the relationship.

That is, the performance indicator and/or landing distance is determined based on a typical performance of both the aircraft and other aircraft under similar environmental conditions and retardation demands, while also accounting for a bias of the aircraft compared to the other aircraft. This leads to a more accurate determination of the performance indicator and/or the landing distance.

Optionally, to select the aircraft landing event data, the processor is configured to select, from the memory, aircraft landing event data comprising environmental conditions and retardation demands that are within a predetermined range of, respectively, the environmental condition and retardation demand represented by the environment information and the retardation information.

Optionally, the processor is configured to select aircraft landing event data comprising environmental conditions and retardation demands that are within a range of up to 2%, up to 5%, up to 10%, up to 20%, up to 50%, or greater than 50% of, respectively, the environmental conditions and retardation demands represented by the environment information and retardation information received by the processor.

In this way, the performance indicator and/or landing distance is more accurately determined based on aircraft landing event data of only those aircraft and those landing events that are similar, respectively, to the aircraft approaching the runway and the anticipated landing event.

Optionally, the processor is configured to implement a machine learning technique to select the aircraft landing event data.

In this way, the processor may more quickly and accurately select aircraft landing event data from a large database of aircraft landing event data in the memory. That is, the memory may store aircraft landing event data for many thousands, tens of thousands, hundreds of thousands, or more aircraft landing events. Using a machine learning technique, or any other advanced data analytic technique, such as a neural network or artificial intelligence, may allow the processor to determine the performance indicator in good time prior to the landing event, and/or to recalculate the performance indicator and/or landing distance reliably in response to changing information on approach to the runway. Optionally, the processor is configured to select the aircraft landing event data in any other suitable way, such as by using any suitable data selection and/or matching method.

Optionally, the environmental condition for each landing event comprises one or both of an atmospheric condition and a surface condition of the runway associated with the landing event.

The atmospheric condition may comprise any one of: a windspeed; a wind direction; a temperature; a level of precipitation; and a humidity. The environment condition may comprise a surface condition of the runway, such as any one or more of: a surface friction; a surface coating (e.g. a level of "wetness", or a category such as wet/dry/icy/oil-coated); and a runway material. Optionally, the environment condition comprises a runway identifier for identifying the runway 20.

Optionally, the environment condition comprises a parameter representative of a wheel slip measured by a braking system of an aircraft which has recently landed on the runway. The wheel slip may be representative of a current friction of the runway during the recent landing event, thereby providing an accurate and up-to-date runway condition that is more representative of the current runway state.

Optionally, the retardation demand for each landing event comprises any one or more of: a deceleration demand; a brake demand; a thrust reverser demand; a landing speed; and a configuration of the aircraft associated with the landing event, such as a configuration of a thrust reverser and/or a flight surface of the aircraft.

Optionally, the retardation demand is determined on the basis of an input from flight crew and/or an autopilot of the aircraft approaching the runway, such as an input representing a desire to slow the aircraft to a taxiing speed on the runway. Optionally, the retardation demand is determined on the basis of any one or more of: a weight of the aircraft approaching the runway; a brake capacity of the aircraft approaching the runway; an available length of the runway 20 on which the aircraft can perform a landing event; and a speed of the aircraft 10, such as a flight speed and/or an anticipated speed of the aircraft 10 during touchdown of the aircraft 10 on the runway. Optionally, the estimated retardation demand is also based on the condition of the runway 20, such as that represented by the received environment information.

In this way, the retardation demand may be a reasonable estimate of the retardation functions required to slow the aircraft on the runway during the anticipated landing event, based on a current state of the aircraft and/or a current state of the runway.

A second aspect of the present invention provides a method of determining a performance indicator of an aircraft approaching a runway, the method comprising: determining an environmental condition of the runway; determining a retardation demand of the aircraft during an anticipated landing event of the aircraft on the runway; selecting, on the basis of the environmental condition and the retardation demand, aircraft landing event data from a memory storing aircraft landing event data; determining the performance indicator of the aircraft on the basis of the selected aircraft landing event data; and communicating the performance indicator to a landing system of the aircraft.

Optionally, the method comprises any of the actions performed by the processor of the aircraft landing event system of the first aspect. Optionally, the method may be performed by the aircraft landing event system of the first aspect.

A third aspect of the present invention provides a non-transitory computer-readable storage medium storing instructions that, when executed by a processor, cause the processor to carry out the method of the second aspect.

Optionally, the processor of the aircraft landing event system of the first aspect is configured to execute the instructions.

A fourth aspect of the present invention provides an aircraft landing system of an aircraft, the aircraft landing system comprising a controller and a flight deck element, the controller communicatively coupled with memory storing aircraft landing event data and configured to: determine an environmental condition representative of a condition of a runway approached by the aircraft; determine a retardation demand representative of a demand to slow the aircraft on the runway during an anticipated landing event of the aircraft on the runway; select, from the memory, aircraft landing event data comprising environmental conditions and runway demands within a predetermined range of, respectively, the environmental condition and retardation demand determined by the controller; determine a performance indicator of the aircraft on the basis of the aircraft landing event data selected by the controller; and cause the flight deck element to display the performance indicator.

Optionally, the controller is configured to determine a landing distance of the aircraft during the anticipated landing event on the basis of the performance indicator. Optionally, the controller is configured to cause the flight deck element to display the landing distance instead of, or as well as, the performance indicator.

Optionally, the aircraft landing system comprises, or is configured to perform, any of the optional features or actions of the aircraft landing event system of the first aspect. Optionally, the aircraft landing system of the second aspect is configured to receive the performance indicator transmitted by the aircraft landing event system of the first aspect.

A fifth aspect of the present invention provides an aircraft comprising the aircraft landing event system of the first aspect, the non-transitory computer-readable storage medium of the third aspect, or the aircraft landing system of the fourth aspect.

BRIEF DESCRIPTION OF THE DRAWINGS

Embodiments of the invention will now be described, by way of example only, with reference to the accompanying drawings, in which.

DETAILED DESCRIPTION

Figure 1:
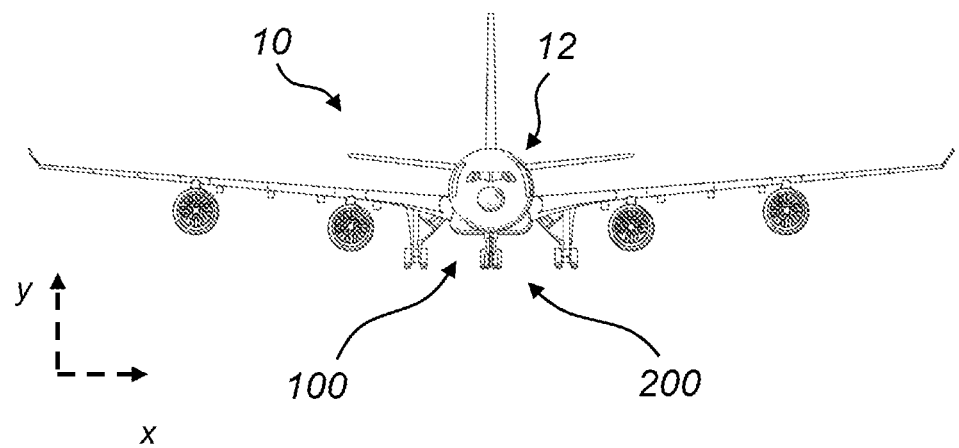
FIG. 1 shows a schematic view of an aircraft according to an example.

The present disclosure describes a system, specifically an aircraft landing event system, for more accurately determining a performance indicator for an upcoming landing event of an aircraft on a runway. In an example described herein and illustrated in the figures, the performance indicator is a landing distance factor to be applied to a landing distance calculation of the aircraft during the upcoming landing event. The aircraft landing event system is further configured to determine a landing distance on the basis of the landing distance factor, and to communicate the landing distance, and/or the landing distance factor, to a landing system of the aircraft.

Specifically, the aircraft landing event system is configured to consult a database of aircraft landing event data associated with previous landing events of the aircraft approaching the runway and plural other aircraft. The aircraft landing event data includes, for each landing event, environmental conditions of the respective runway—such as a friction of the runway surface and/or a wind speed associated with the landing event—a retardation demand representative of a demand to slow the aircraft on the runway during the landing event, and a performance indicator, such as a landing distance factor, of the aircraft on the runway. In some examples, the retardation demand is determined on the basis of the configuration or type of the aircraft, such as a weight of the aircraft, and whether the aircraft has operable reverse thrusters.

For the upcoming landing event of the approaching aircraft on the runway, the landing event system is configured to determine an environmental condition and a retardation demand. The aircraft landing event system then selects, from the database, aircraft landing event data comprising environmental conditions and retardation demands that are like those of the upcoming landing event. The selected data is used to more accurately determine the performance indicator, such as the landing distance factor, for the upcoming landing. The performance indicator and/or the landing distance determined on the basis thereof is then communicated to a landing system of the aircraft, such as to a braking control system and/or flight deck display.

As will be described herein, to determine the performance indicator, the aircraft landing event data selected from the database is used to determine a relationship between the landing distance factors of previous landing events and the associated environment conditions and retardation demands. That is, the aircraft landing event system uses landing event data of many similar landing events of the current aircraft and plural other aircraft to establish a statistical model—specifically a regression model—representing a variation in the landing distance factor as a function of each of the environmental conditions and retardation demands. The landing distance factor for the upcoming landing event of the approaching aircraft is then determined from the statistical model, by inputting the specific environmental conditions and anticipated retardation demands of the upcoming landing event.

As will also be described herein, in the illustrated example, the aircraft landing event system is configured to determine a performance factor representative of a typical performance of the aircraft compared to other aircraft, on the basis of the selected landing event data. That is, a "bias" of the aircraft compared to the other aircraft is determined. Such a bias may be present due to differences in tyre wear, brake wear, and/or closed loop control tolerances of the aircraft compared to other aircraft, for example. The relationship discussed hereinbefore is then determined on the basis of the performance factor, so that the relationship takes into account the bias of the approaching aircraft. In other words, the landing distance factor is determined by considering the current runway conditions, the anticipated retardation demands, and the typical performance of the aircraft compared to other aircraft. In this way, the relationship provides a more accurate landing distance factor specific to the approaching aircraft.

We now describe an example embodiment of the aircraft landing event system with reference to the Figures.

FIG. 1 shows a schematic diagram of an example of an aircraft 10 comprising a flight deck 12 and an aircraft landing event system 100. In the illustrated example, the aircraft 10 also comprises an aircraft landing system 200.

Figure 2:
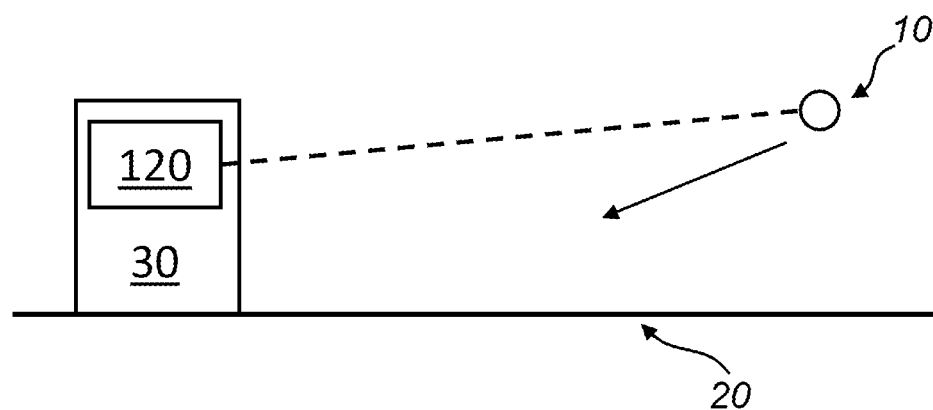
FIG. 2 shows a schematic view of a runway according to an example.

FIG. 2 shows a schematic representation of a runway 20 being approached by the aircraft 10. That is, the aircraft 10 is approaching the runway 20 to perform a landing event on the runway 20, such as in the direction of the arrow in FIG. 2. As such, the aircraft 10 may be referred to herein as an "approaching aircraft" or "landing aircraft". FIG. 2 also shows an example of a runway system 120 associated with the runway 20. The runway system 120 in this example is comprised in an air traffic control tower 30 of the runway 20. The aircraft 10 is communicatively coupled to the runway system 120. Specifically, the landing event system 100 of the aircraft 10 is communicatively coupled to the runway system 120 via a communications channel or link, which is represented by the dotted line. In some examples, the aircraft landing event system 100 and/or the runway system 120 comprises a transmitter and/or a receiver, such as comprised in a communications module, for passing information between the aircraft landing event system 100 and the runway system 120.

Figure 3:
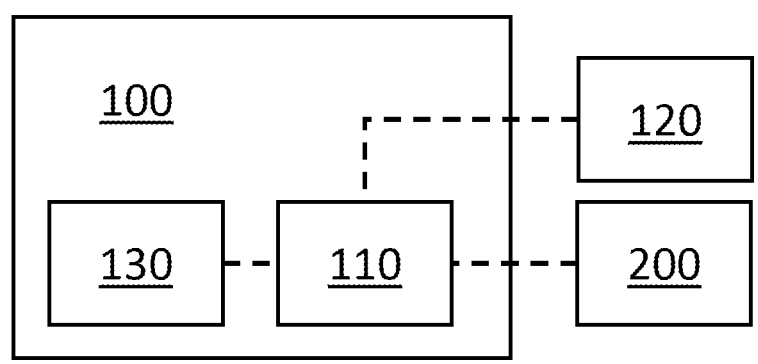
FIG. 3 shows a schematic diagram of a landing event system according to an example.

FIG. 3 shows a schematic diagram of the aircraft landing event system 100. The aircraft landing event system 100 comprises a processor 110 communicatively coupled, or couplable, with memory 130, which is illustrated in FIG. 3 as being comprised in the aircraft landing event system 100. The processor 110 is also communicatively coupled with the landing system 200 of the aircraft 10 and the runway system 120 of the runway approached by the aircraft 10. The processor 110 is configured to send and/or receive signals from the runway system 120 and the landing system 200.

The runway system 120 is configured to determine an environmental condition of the runway 20. As will be described in more detail hereinafter, the environmental condition is representative of a condition of a surface of the runway 20, and/or an atmosphere surrounding the runway 20. The runway system 120 is configured to communicate environment information representative of the environmental condition, such as in the form of an environment signal, to the processor 110 of the landing event system 100.

The aircraft landing system 200 is configured to determine a retardation demand for an upcoming landing event of the aircraft 10 on the runway 20. As will be described in more detail hereinafter, the retardation demand is representative of a demand to slow the approaching aircraft 10 on the runway 20 during the landing event to a taxiing speed. The aircraft landing system 200 is configured to communicate retardation information representative of the retardation demand, such as in the form of a retardation information, to the aircraft landing event system 100, specifically to the processor 110.

The memory 130 stores aircraft landing event data. The aircraft landing event data comprises data associated with multiple previous aircraft landing events of the landing aircraft 10 and other aircraft. Specifically, the aircraft landing event data comprises landing event data associated with many hundreds, thousands, tens of thousands, or hundreds of thousands of previous landing events of a plurality of aircraft. More specifically, for each landing event, the aircraft landing event data comprises environmental conditions, retardation demands, and performance indicators, such as landing distances or landing distance factors, associated with the respective landing events. In some examples, the memory 130 stores aircraft landing event data associated with landing events performed on a plurality of runways, including the runway 20 being approached by the landing aircraft 10. In other examples, the landing event data stored in the memory 130 is associated with landing events only on the particular runway 20 being approached.

The processor 110 is configured to receive the environmental information from the runway system 120 and the retardation information from the aircraft landing system 200. The processor 110 then selects, from the memory 130, aircraft landing event data having environmental conditions and retardation demands corresponding to those represented by the received environmental information and retardation information. That is, the processor 110 selects aircraft landing event data of previous landing events that correspond to, or have similar landing profiles to, the upcoming landing event of the approaching aircraft 10.

As will be described in more detail hereinafter in relation to the method 400 of FIG. 4, in the illustrated example, the processor 110 is also configured to determine a performance factor for the aircraft 10, which represents how the aircraft 10 typically performs compared to other aircraft used to generate the aircraft landing event data stored in the memory 130.

The processor 110 then determines a performance indicator, such as a landing distance factor, for the upcoming landing event, on the basis of the selected data and the performance factor. The performance indicator determined by the processor 110 is an anticipated performance indicator of an upcoming landing event of the aircraft 10 on the runway 20. In some examples, the performance indicator is any one of the performance indicators described hereinbefore. The processor 110 then communicates the landing distance factor to the aircraft landing system 200.

In some examples, the processor 110, or the aircraft landing system 200, is configured to determine a landing distance for the upcoming landing on the basis of the performance indicator. In some such examples, the processor 110 is configured to communicate the landing distance to the aircraft landing system 200. In some examples, the aircraft landing system 200 comprises a flight deck element, such as a flight deck display, and is configured to communicate the performance indicator and/or the determined landing distance to the flight deck element, such as to display the performance indicator and/or landing distance on the flight deck display.

In examples comprising a flight deck element, flight crew of the aircraft 10 are provided with an indication of, and/or an opportunity to take action on the basis of, the performance indicator and/or the landing distance associated with the upcoming landing event of the aircraft 10 on the runway 20. For example, if the determined landing distance is less than that expected, such as less than a landing distance calculated using predetermined conservative multiplication factors, the flight crew may decide to cause the aircraft 10 to touchdown later on the runway 20. This may reduce fuel burn and/or noise pollution of the landing aircraft 10. Alternatively, if the anticipated landing distance is larger than expected, given the environmental conditions of the runway, the achievable retardation demand from the aircraft 10, and the typical performance of the aircraft 10 compared to other aircraft, the flight crew may decide to land the aircraft 10 on a different runway to the runway 20, such as an adjacent runway, or even a runway at another airport. In some examples, the aircraft 10 comprises an autopilot system (not shown), which can make such decisions on behalf of flight crew. In such examples, the processor 110 and/or the aircraft landing system 200 may be configured to communicate the performance indicator and/or the determined landing distance to the autopilot system.

We now describe, in more detail, examples of the types of environmental conditions, retardation demands, and aircraft landing event data that can be used by the processor 110. We then describe, with reference to the method shown in FIG. 4, how these conditions and demands may be used by the processor 110 to determine the performance indicator, in the illustrated example presented herein.

In some examples, the environment condition comprises an atmospheric condition associated with the runway 20, such as any one or more of: a wind speed; a wind direction; a temperature; a level of precipitation; and a humidity. In some examples, the environment condition comprises a surface condition of the runway 20, such as any one or more of: a friction; a surface coating (e.g. a level of "wetness", or a category such as wet/dry/icy/oil-coated); and a runway material. In some examples, the environment condition comprises a runway identifier for identifying the runway 20.

In some examples, the environment condition comprises a parameter representative of a wheel slip measured by a braking system of an aircraft which has recently landed on the runway 20. The term "wheel slip" is understood to represent a level of reactive force able to be developed between a wheel of an aircraft and a runway before the wheel locks and starts to slide over the runway surface without rotating. This, in turn, is representative of a friction of the runway. For example, a surface coating of water on the runway, such as the runway 20, may lower the coefficient of friction of the runway 20. This, in turn, may cause the wheel to lock at a lower reactive force, and thus with a lower braking applied by the braking system, than if the runway 20 were dry.

In some examples, an anti-lock braking system is configured to cause braking of the wheels of such an aircraft to maximise wheel slip. That is, the anti-lock braking system causes the level of braking to be maintained at a level close to, but not exceeding, a level that would cause the wheel to lock. In some examples, for a landing event of a previously-landed aircraft, an anti-lock braking system of that aircraft determines the parameter representative of the maximum achieved wheel slip in the form of a braking force, or braking torque, able to be output by a braking system of the aircraft before one or more wheels lock. In some examples, the approaching aircraft 10 comprises such an anti-lock braking system.

In some examples, the environment condition is provided in the form of a profile of a condition of the runway 20 over a length of the runway 20, and/or a mapping of the condition of the runway 10 over a length and a breadth of the runway 20. For example, the environment condition may be a maximum wheel slip profile representing a maximum level of wheel slip achieved by a respective aircraft as a function of a distance of the aircraft along the runway 20.

In some examples, the retardation demand comprises any one or more of: a deceleration demand; a brake demand (e.g. brake force); a thrust reverser demand; a landing speed; and a configuration of the aircraft, such as the presence or absence of operable thrust reversers, and/or an extension of flight surfaces of the aircraft, such as slats, flaps and/or spoilers. In some examples, the retardation demand is provided in the form of a profile of a demand to slow the aircraft 10 over a length of the runway 20, and/or a mapping of a demand to slow the aircraft 10 over a length and a breadth of the runway 20.

In some examples, the retardation demand is determined on the basis of an input from flight crew and/or an autopilot of the approaching aircraft 10, such as an input representing a desire to slow the aircraft 10 to a taxiing speed on the runway 20. In some examples, the retardation demand is determined on the basis of any one or more of: a weight of the approaching aircraft 10; a brake capacity of the approaching aircraft 10; an available length of the runway 20 on which the aircraft can perform a landing event; and a speed of the aircraft 10, such as a flight speed and/or an anticipated speed of the aircraft 10 during touchdown of the aircraft 10 on the runway. In some examples, the estimated retardation demand is also based on the condition of the runway 20, such as that represented by the received environment information.

In other words, the retardation demand is a reasonable estimate of the retardation functions required to slow the approaching aircraft 10 on the runway 20, based on a current state of the aircraft 10, and, in some examples, a current state of the runway 20. This initial estimate may be sub-optimal, in that conservative assumptions may be made about the performance of the aircraft 10 and/or the condition of the runway 20 when determining the retardation demand. By determining the performance indicator as described herein, a more accurate landing distance of the aircraft 10 may be determined, and the anticipated retardation demand may be adjusted accordingly. This may be iterative, in order to provide a better estimate of the retardation demand and/or the landing distance for the upcoming landing event.

In some examples, the aircraft 10 comprises one or more sensors and/or systems (not shown) for detecting a current status of the aircraft 10. In some examples, the current status comprises one or more of: a location of the aircraft 10; an attitude of the aircraft 10; an inertial reference of the aircraft 10, such as an airspeed, angle of attack and/or altitude of the aircraft 10; a mass, or weight, of the aircraft; a centre of gravity the aircraft; and a configuration of the aircraft 10, such as a configuration of a landing gear and/or flight surface of the aircraft 10. In some examples, the one or more sensors and/or systems comprises any one or more of: a Global Positioning System (GPS); an accelerometer; an airspeed sensor; a fuel level sensor; and an altitude sensor. In some examples, the status of the aircraft 10, as detected by the sensors, is used to determine one or more of the environmental conditions and/or retardation demands of the upcoming landing event. By way of an illustrative example only, a fuel level sensor may be used to determine a current mass and/or a centre of gravity of the aircraft. The mass and/or centre of gravity may then be used to determine a retardation demand of the aircraft, such as to determine a required flight surface configuration for touchdown and/or to estimate a downforce on a particular wheel or landing gear of the aircraft during the upcoming landing event. In some examples, the sensors are configured to directly sense an environment condition, such as an atmospheric condition as described hereinbefore. In some examples, the aircraft landing system 200 is configured to receive environment information representative of the environment condition sensed by the sensors, and to communicate the environment information to the processor 110.

In some examples, the performance indicator for the upcoming landing event and/or for each landing event of the aircraft landing event data stored in the memory 130, is, or is representative of, any one of: a landing distance factor for the respective landing event; a landing distance of the respective landing event; and a time to slow the respective aircraft from a landing speed to a predetermined threshold speed. It will be understood that the performance indicator can be defined in any other suitable way.

In some examples, the "landing distance" referred to herein is a distance travelled by a respective aircraft from touchdown of the aircraft on a runway until a speed of the aircraft drops below a predetermined threshold speed, such as until the aircraft reaches a taxiing speed. In some examples the predetermined threshold speed is zero, such that the landing distance is a distance over which the aircraft is slowed to a stop following touchdown of the aircraft on a runway. In other examples, the landing distance is a distance from touchdown of the aircraft on the runway to location where the aircraft merges onto a taxiway branching from the runway.

Figure 4:
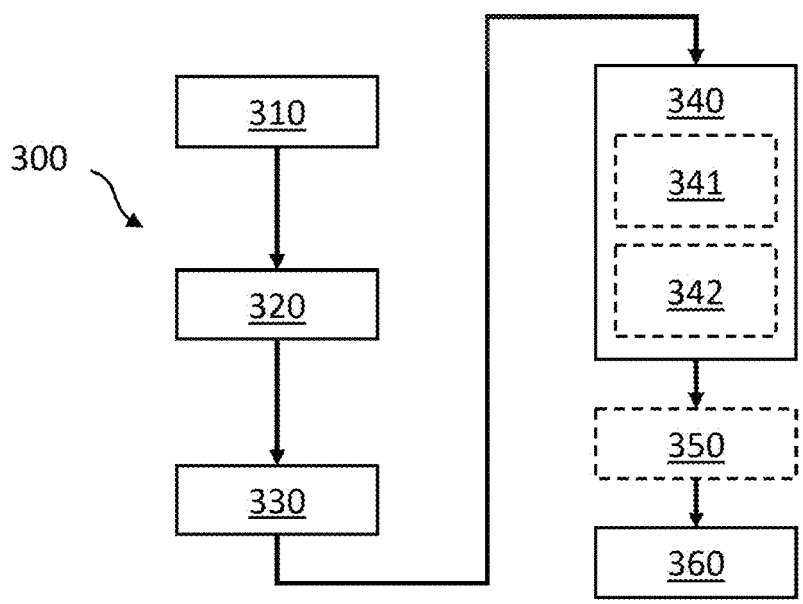
FIG. 4 shows a schematic flow diagram of a method according to an example.

Turning now to FIG. 4, we describe a method 300 of determining the performance indicator of the landing aircraft 10. The method 300 is performed by the landing event system 100, specifically the processor 110. As such, the method 300 is herein described in relation to actions the processor 110 is configured to perform. It will be understood, however, that in other examples the method 300 is performed by any other suitable processor and/or system.

As noted hereinbefore, the landing event system 100, and specifically the processor 110, is configured to receive 310 the environment information from the runway system 120, and to receive 320 the retardation information from the aircraft landing system 200 as described hereinbefore. The processor 110 is also configured to: select 330 aircraft landing event data from the memory 130 on the basis of the received 310, 320 environment information and retardation information; determine 340 a performance indicator of the landing aircraft 10 on the basis of the aircraft landing event data selected 330 by the processor 110; and communicate 360 the performance indicator to the landing system 200. In the illustrated example, the performance indicator is a landing distance factor to be applied to a landing distance calculation, as described hereinbefore.

In some examples it will be understood that the receiving 310 the environment information by the processor 110 comprises determining 310 one or more environmental conditions, such as on the basis of the received environment information. Similarly, it will be understood that, in some examples, the receiving 320 the retardation information by the processor 110 comprises determining 320 one or more retardation conditions, such as on the basis of the received retardation information.

That is, in the illustrated example, the processor 110 is configured to select 330, or extract, aircraft landing event data having environmental conditions and retardation demands that correspond to, or are broadly similar to, the environmental conditions and retardation demands of the upcoming landing event of the landing aircraft 10 on the runway 20. Specifically, in the illustrated example, the method 300 comprises selecting 330, from the memory 130, aircraft landing event data comprising environmental conditions and retardation demands that are within a predetermined range of, respectively, the environmental condition and retardation demand represented by the received environment information and retardation information. In other words, the method comprises selecting 330 only the aircraft landing event data that is that relevant to the upcoming landing event.

In some examples, to select 330 the aircraft landing event data, the processor 110 is configured to select 330, from the memory 130, aircraft landing event data associated only with the runway 20 being approached by the aircraft. In other examples, the aircraft landing event data selected 330 by the processor 110 may be aircraft landing event data from any suitable runway.

In some examples, the processor 110 is configured to select 330 aircraft landing event data comprising environmental conditions and/or retardation demands that are within up to 2%, up to 5%, up to 10%, up to 20%, up to 50%, or greater than 50% of, respectively, the environmental conditions and retardation demands represented by the environment information and retardation information. In an illustrative example, for ease of understanding, the environment information is representative of environmental conditions comprising a crosswind having a speed of 10 knots, and a runway surface classified as "wet". The retardation information is representative of retardation demands comprising a demand to brake the aircraft 10 by employing reverse thrusters at 50%, and a demand to apply 20% more braking force to wheels on a first side of a fuselage of the aircraft 10 than wheels on a second, opposite side of the fuselage. That is, the crosswind may increase a downforce on the first-side wheels, allowing them to be braked with a higher braking force. In that case, the processor 110 selects 330 aircraft landing event data from the memory 130 comprising: a crosswind of between 8 knots and 12 knots; a runway surface condition in the category "wet"; reverse thruster demands of between 40% and 60%; and brake demands of wheels on the first side of the aircraft fuselage of between 10% and 30% more than brake demands for wheels on the second side of the aircraft fuselage. It is reiterated that this is an illustrative example only, and that the aircraft landing event data may be matched to any other suitable environment conditions and/or retardation demands.

As stated hereinbefore, in some examples, the memory 130 is configured store aircraft landing event data of many hundreds of thousands (or more) of aircraft landing events. As such, in some examples, in order to select 330 the aircraft landing event data from the memory 130, the processor 110 is configured to implement a machine learning technique or other advanced data analytic technique. In other words, the landing event system 100 uses artificial intelligence to select 330 the aircraft landing event data from the memory 130. In some examples, the processor 110 is configured to use a neural network system trained to select 330 suitable aircraft landing event data from the memory on the basis of the environmental and retardation information. In such examples, the neural network is regularly updated and trained to account for new aircraft landing event data stored in the memory 130. In some examples, the processor is configured to select the aircraft landing event data in any other suitable way, such as by using any suitable data selection and/or matching method. That is, the aircraft landing event data may, in some examples, be selected without using a machine learning and/or artificial intelligence technique.

In the illustrated example, to select 330 the aircraft landing event data, the processor 110 is configured to select 330, from the memory 130, aircraft landing event data of both the landing aircraft 10 and other aircraft on the basis of the environment information and the retardation information. To determine 340 the performance indicator, the processor 110 is configured to compare 341 the landing event data of the landing aircraft 10 with the landing event data of the other aircraft, as selected by the processor 110. Specifically, the comparing 341 comprises determining 341 a performance factor representative of a performance of the landing aircraft 10 compared to the other aircraft.

Figure 6:
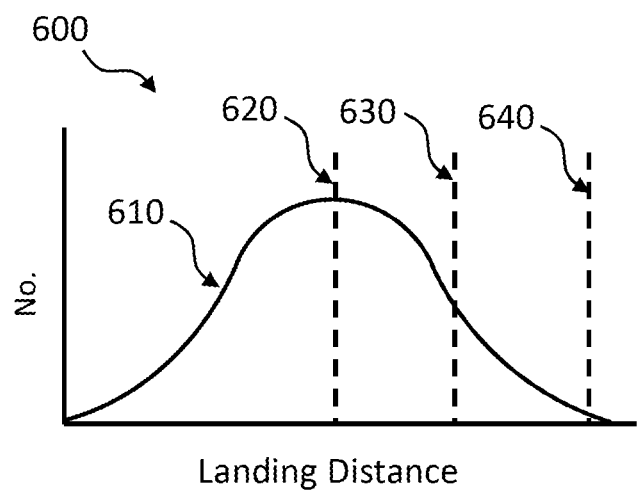
FIG. 6 shows an example performance indicator distribution according to an example.

In the illustrated example, to determine 341 the performance factor, the processor 110 is configured to determine, from the aircraft landing event data, a statistical distribution of recorded landing distances for the landing events of aircraft other than the landing aircraft 10. FIG. 6 shows an example such a distribution 600 represented by a distribution curve 610, which here is a bell curve resembling a normal distribution. Specifically, the distribution curve 610 shows a frequency (on the y-axis) at which the landing distances (on the x-axis) occur in the aircraft landing event data selected by the processor. It will be understood that the statistical distribution 600 of landing distances is provided for environmental conditions and/or retardation demands which are the same or broadly similar to those of the upcoming landing event of the landing aircraft 10. In other examples, the statistical distribution is a statistical distribution of landing distance factors, or other suitable aircraft landing performance indicators.

To determine 341 the performance factor, the processor 110 is configured to determine an average landing distance 620, such as a mean or a median landing distance 620, on the basis of the distribution 600. FIG. 6 shows a dashed line numbered 620 indicating such a median landing distance 620, which represents the typical performance of a "median aircraft" for the environmental conditions and retardation demands of the upcoming landing event of the landing aircraft 10. The processor 110 is then configured to determine a landing distance 630, or average landing distance 630, such as a mean or median landing distance 630, of the landing aircraft 10. Specifically, the average landing distance 630 of the landing aircraft 10 is determined based on aircraft landing event data of previous landing events of the landing aircraft 10 under similar environmental conditions and retardation demands to those of the upcoming landing event.

The processor 110 is then configured to compare 341 the average landing distance 630 of the landing aircraft 10 with the average landing distance 620 of the "median aircraft". In the illustrated example, the comparing 341 is performed by determining 341 the performance factor on the basis of the average landing distances of both the landing aircraft 10 and the median aircraft. Specifically, the processor 110 is configured to determine 341 the performance factor as a ratio, or difference, between the average landing distance 630 of the landing aircraft 10 and the average landing distance 620 of the median aircraft. In other examples, the performance factor is represented as a standard deviation of the average landing distance 630 of the landing aircraft 10 from the average landing distance 20 of the median aircraft. The performance factor is then stored in the memory 130, along with the associated environmental conditions and retardation demands. In some examples, the performance factor is passed to flight crew and/or maintenance crew. In this way, if the performance factor indicates that the aircraft is performing sub-optimally, this may be flagged to the flight crew and/or the maintenance crew, and an investigation and/or maintenance procedure may be initiated.

It will be understood that the performance factor represents a typical performance of the landing aircraft 10 compared to that of the median aircraft. In other words, the performance factor is indicative of a "bias" of the landing aircraft 10 compared to other aircraft. In the example shown in FIG. 6, the average landing distance 630 of the landing aircraft 10 is larger than the average landing distance 620 of the median aircraft, which may indicate, for example, that the landing aircraft 10 typically exhibits a lower braking performance than other, similar aircraft under similar landing conditions. This may be due to, for example, differences in tyre wear, brake wear, aerodynamic performance, equipment tolerances, and/or closed loop control tolerances of the landing aircraft 10 compared to the other aircraft.

It will also be understood that as components of the landing aircraft 10, such as tyres, brake pads and other braking system components, degrade through use, the average landing distance 630 of the landing aircraft 10 may move further to the right in FIG. 6 (i.e. the typical landing distance of the landing aircraft 10 may increase). In some examples, the average landing distance 630 of the landing aircraft 10 may be a weighted average landing distance 630, weighted towards more recent landing events. In this way, the average landing distance 630 may provide a more up-to-date representation of the current state of the landing aircraft 10. For example, a newer landing aircraft 10, or a landing aircraft 10 that has recently received replacement braking system components, such as new tyres and/or brake pads, may perform better than the median aircraft. In such a case, an average landing distance 630 of the landing aircraft 10 may be less than the average landing distance 620 of the median aircraft.

As will be discussed in more detail below, in other examples, the processor 110 may not determine 341 the performance factor, or may determine 341 the performance factor to be a predetermined conservative multiplication factor. Using a predetermined conservative multiplication factor may equate to using a conservative average landing distance for the landing aircraft 10, as illustrated by the line 640 in FIG. 6.

Returning now to FIG. 4, in the illustrated example, to determine 340 the performance indicator of the landing aircraft, the method 300 further comprises determining 342, on the basis of the aircraft landing event data selected 330 by the processor 110, a relationship between the performance indicators of the selected aircraft landing event data and one or a number of the stored environmental conditions and retardation demands. The processor 110 then determines 340 the performance indicator of the landing aircraft 10 on the basis of the relationship and the received environment information and the retardation information.

To determine 342 the relationship, the processor 110 is configured to perform a statistical analysis on the selected 330 aircraft landing event data. Specifically, in the present example, the processor 110 is configured to determine a regression model of the relationship between the performance indicators of the selected 330 aircraft landing event data (herein the "selected performance indicators") and each of the environmental conditions and retardation demands which have been used to select 330 the aircraft landing event data.

Figure 7A:
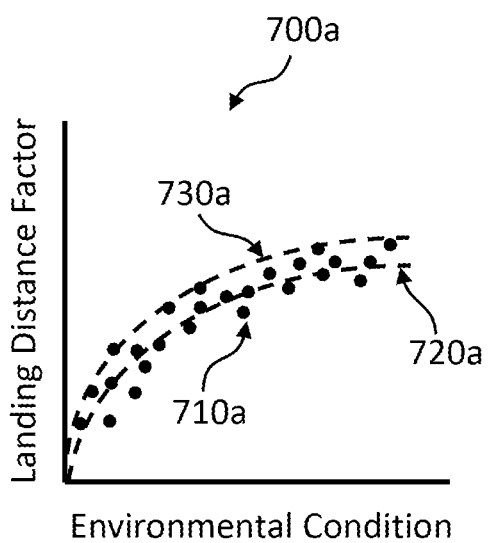
FIGS. 7a and 7b show example regression curves according to an example.
Figure 7B:
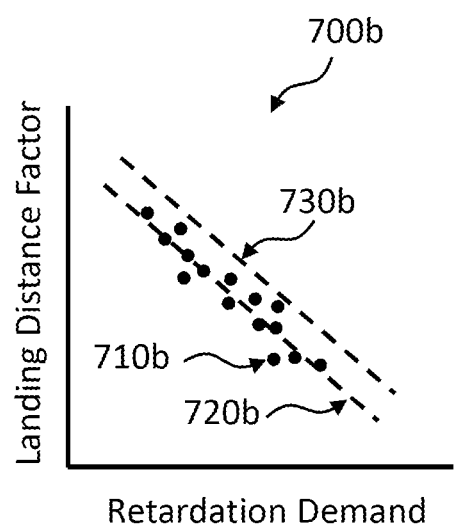

FIG. 7*a* shows an example of such a relationship 700*a* between the selected 330 performance indicators and an environmental condition. In FIG. 7*a*, for ease of understanding, the selected 330 performance indicators are landing distance factors of the landing events from which the aircraft landing event data is compiled, and the environmental condition is a runway surface wetness. FIG. 7*b* shows another example of such a relationship 700*b*, this time between the stored performance indicators and a retardation demand, such as a total braking force of all wheels of an aircraft. FIGS. 7*a* and 7*b* show respective sets of data points 710*a*, 710*b* of the selected 330 aircraft landing event data. FIGS. 7*a* and 7*b* also show respective regression curves 720*a*, 720*b* determined 341 by the processor 110 based on the respective sets of data points 710*a*, 710*b*, in the illustrated example.

It can be seen that the relationship 700*a*, 700*b* for each of the environmental conditions and/or retardation demands is defined over a range of the respective environmental conditions and/or retardation demands. The range in each case is relatively narrow, as a result of the processor 110 selecting 330 aircraft landing event data having environmental conditions and retardation demands that are similar to, such as within a particular range of, those represented by the received 310, 320 environment information and retardation information, as discussed hereinbefore.

In the illustrated example, the processor 110 is configured to account for the performance factor when determining 342 the relationships between the selected 330 performance indicators, environmental conditions and retardation demands. Specifically, the performance factor is used to generate an adjusted regression model, which is represented by the regression curves numbered 730*a* and 730*b* in respective FIGS. 7*a* and 7*b*. In this way, by taking into account the bias of the landing aircraft 10 compared to other aircraft, the adjusted regression curves 730*a*, 730*b* represent relationships between the landing distance factor and both the environmental conditions and retardation demands for the specific landing aircraft 10.

The processor 110 is then configured to determine 340 the performance indicator for the upcoming landing on the basis of the regression models 700*a*, 700*b*, the environmental conditions and the retardation demands for the upcoming landing. Specifically, for the given environment condition and retardation demand of the upcoming landing event (e.g. for a particular surface wetness of the runway 20 and anticipated braking force demand), the processor 110 determines the landing distance factors from the adjusted regression curves 730*a*, 730*b*. The processor 110 then uses these landing distance factors to determine a total landing distance factor, such as by taking an average, weighted average, or other suitable statistical measure of the determined landing distance factors.

In the illustrated example, the method 300 also comprises determining 350 a landing distance for the upcoming landing event of the landing aircraft 10 on the basis of the performance indicator. Specifically, the landing distance is determined 350 by applying the determined 340 performance indicator, such as in the form of a multiplication factor, to a typical landing distance calculation based on the environmental conditions and retardation demands for the upcoming landing event. In examples where such a landing distance is determined 350, the communicating 360 the performance indicator to the landing system 200 of the landing aircraft 10 instead, or in addition, comprises communicating 360 the landing distance to the landing system 200.

In some examples, the performance indicator for the upcoming landing event is instead determined 340 using the unadjusted relationships 720*a*, 720*b*, without taking into account the performance factor, and the performance factor is subsequently applied as a multiplication factor when determining 350 the landing distance. In some examples, the performance factor is a pre-determined conservative performance factor, as discussed hereinbefore, leading to a conservative performance indicator and/or landing distance. In other examples, the method 300 does not comprise determining 341 the performance factor, and instead comprises determining 340 the performance parameter 341 (and subsequently determining 350 the landing distance) on the basis of the unadjusted regression models 720*a*, 720*b* alone. In this case, the determined 350 landing distance for the upcoming landing event may be more realistic than one calculated using a conservative multiplication factor, but may be less accurate than if the calculation were to take into account the bias of the landing aircraft 10.

It will be understood that the bias of the landing aircraft 10, and/or the determined 342 relationship, or regression model, may be determined more accurately by providing a larger dataset from which to select 330 the aircraft landing event data of the landing aircraft 10 and other aircraft. As such, the aircraft landing event data stored in the memory 130 should be built up over time to provide aircraft landing event data for landing events of the landing aircraft 10 and other aircraft on many different runways, and under many different environmental conditions and retardation demands.

Figure 5:
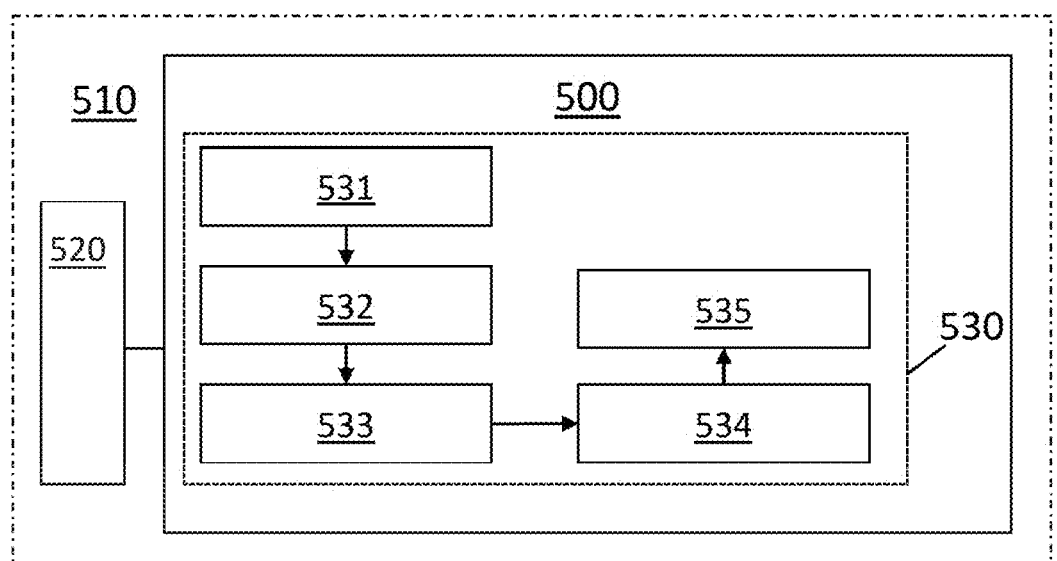
FIG. 5 shows a schematic diagram of a non-transitory computer-readable storage medium according to an example.

FIG. 5 shows a schematic diagram of a non-transitory computer-readable storage medium 500 according to an example. The non-transitory computer-readable storage medium 500 stores instructions 530 that, if executed by a processor 520 of a controller 510 or system 510, cause the processor 520 to perform a method according to an example. In some examples, the controller 510 or system 510 is the landing event system 100 and the processor 520 is the processor 110 as described above with reference to FIG. 2 or FIG. 3 or any variation thereof discussed herein.

The instructions 530 comprise: receiving 531 environment information representative of an environmental condition; receiving 532 retardation information representative of a retardation demand; selecting 533, on the basis of the environmental information and the retardation information, aircraft landing event data from a memory, such as the memory 130; determining 534 a performance indicator on the basis of the selected 330 aircraft landing event data; and communicating 535 the performance indicator, or information representative thereof, to the landing system 200 of the landing aircraft 10. In other examples, the instructions 530 comprise instructions to perform any other example method described herein, such as the method 200 described above with reference to FIG. 4.

It will be understood that while the above examples are described in relation to an aircraft landing event system 100 of an aircraft 10, in some examples, the aircraft landing event system 100 is comprised in an air traffic control tower 30 of a runway 20, or in any other suitable location. Moreover, although the aircraft landing event system 100 described herein is communicatively coupled to the landing system 200 of the aircraft 10 and the runway system 120, in other examples, the aircraft landing event system comprises either or both of the landing event system 200 and the runway system 120. In other examples, the aircraft landing system 200 is configured to be communicatively coupled, or couplable, to the runway system 120. In this way, the processor 110 may be configured to receive environment information from the landing system 200 rather than, or as well as, from the runway system 120.

In some examples, the memory 130 is a cloud-based memory 130, such as accessible via a networked communication system. In other examples, the memory 130 is comprised in the aircraft landing event system 100, the runway system 120, or the aircraft landing system 200. In some examples, the runway system 120 and/or the aircraft landing system 200 is communicatively coupled, or couplable, to the memory 130 or a part of the memory.

In some examples, the processor 110 is configured to cause one or more of: the environment condition(s) of the runway 20; the retardation demand(s) of the landing aircraft 10; the relationship(s); and the performance factor(s), to be stored in the memory 130, or any other suitable memory, such as before, during, or after the upcoming landing event of the landing aircraft 10 on the runway 20.

It is to be noted that the term "or" as used herein is to be interpreted to mean "and/or", unless expressly stated otherwise.

The above embodiments are to be understood as non-limiting illustrative examples of how the present invention, and aspects of the present invention, may be implemented. Further examples of the present invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the present invention, which is defined in the accompanying claims.

The invention claimed is:

1. An aircraft comprising:
a landing event system including a processor communicatively coupled with memory storing aircraft landing event data, the processor configured to:
receive environment information representative of an environmental condition of a runway being approached by the aircraft;
receive, from a landing system of the aircraft, retardation information representative of a retardation demand of the aircraft during an anticipated landing event of the aircraft on the runway;
select a sub-set of the aircraft landing event data stored in the memory based on the environment information and the retardation information;
determine a performance indicator for the anticipated landing event based on the aircraft landing event data selected by the processor; and
communicate the performance indicator to a landing system of the aircraft before the aircraft performs the anticipated landing event, and
the landing system controlling the anticipated landing event using the performance indicator and the landing system determining the retardation demand,
wherein the aircraft landing event data stored in the memory includes aircraft landing event data for a plurality of historical aircraft landing events, and the aircraft landing event data for each of the historical landing events includes data representing an environmental condition, a retardation demand and a performance indicator for the historical landing event;
wherein the sub-set of the aircraft landing event data is aircraft landing event data for the historical landing events corresponding to at least one of:
i. the runway being approached by the aircraft;
ii. the environmental condition of the runway being approached by the aircraft, or
iii. the retardation demand for the anticipated landing event;
wherein the processor determines a relationship between the performance indicators and both the environment conditions and the retardation demands for the historical landing events in the sub-set of the aircraft landing event data selected by the processor, and
wherein the determination of the performance indicator for the anticipated landing event uses the relationship to analyze the environmental information representative of the environmental condition of the runway being approached by the aircraft and the retardation information representative of the retardation demand of the aircraft during the anticipated landing event.

2. The aircraft of claim 1, wherein the performance indicator is a landing distance factor to be applied to a landing distance calculation.

3. The aircraft of claim 1, wherein the processor is configured to determine a landing distance of the aircraft during the anticipated landing event based on the performance indicator and the landing distance is communicated to the landing system as the performance indicator or in addition to the performance indicator.

4. The aircraft of claim 1, wherein the aircraft landing event data stored in the memory comprises, for each landing event, an environmental condition, a retardation demand, and a performance indicator.

5. The aircraft of claim 1, wherein the aircraft landing event data stored in the memory comprises landing event data of the aircraft and landing event data of other aircraft.

6. The aircraft of claim 1, wherein the processor is configured to determine a performance factor of the aircraft by comparing the landing event data of the aircraft with the landing event data of other aircraft, as selected by processor.

7. The aircraft of claim 6, wherein the processor is configured to determine the performance indicator for the anticipated landing event based on the performance factor and the relationship between the performance indicator and both the environment condition and the retardation demand.

8. The aircraft of claim 1, wherein, to select the aircraft landing event data, the processor is configured to select, from the memory, aircraft landing event data comprising environmental conditions and retardation demands that are within a predetermined range of, respectively, the environmental condition and the retardation demand represented by the environment information and the retardation information.

9. The aircraft of claim 1, wherein the processor is configured to implement a machine learning technique to select the aircraft landing event data.

10. The aircraft of claim 1, wherein the environmental condition for each landing event comprises one or both of an atmospheric condition and a surface condition of the runway associated with the landing event.

11. The aircraft of claim 1, wherein the retardation demand for each landing event comprises any one or more of: a deceleration demand; a brake demand; a thrust reverser demand; a landing speed; and a configuration of a flight surface of the aircraft associated with the landing event.

12. A method of determining a performance indicator of an aircraft approaching a runway, the method comprising:
   determining an environmental condition of the runway;
   determining, by a landing system of the aircraft, a retardation demand of the aircraft during an anticipated landing event of the aircraft on the runway;
   selecting, based on the environmental condition and the retardation demand, a sub-set of aircraft landing event data stored in a memory;
   determining the performance indicator of the aircraft based on the selected aircraft landing event data;
   communicating the performance indicator to a landing system of the aircraft before the aircraft performs the anticipated landing event, and
   controlling the anticipated landing event using the performance indicator,
   wherein the aircraft landing event data stored in the memory includes aircraft landing event data for a plurality of historical aircraft landing events, and the aircraft landing event data for each of the historical landing events includes data representing an environmental condition, a retardation demand and a performance indicator for the historical landing event;
   wherein the sub-set of the aircraft landing event data is the aircraft landing event data for the historical landing events corresponding to at least one of:
   i. the runway being approached by the aircraft;
   ii. the environmental condition of the runway being approached by the aircraft, or
   iii. the retardation demand for the anticipated landing event;
   wherein the processor determines a relationship between the performance indicators and both the environment conditions and the retardation demands for the historical landing events in the sub-set of the aircraft landing event data selected by the processor, and
   wherein the determination of the performance indicator for the anticipated landing event uses the relationship to analyze the environmental information representative of the environmental condition of the runway being approached by the aircraft and the retardation information representative of the retardation demand of the aircraft during the anticipated landing event.

13. A non-transitory computer-readable storage medium storing instructions that, when executed by a processor, cause the processor to carry out the method of claim 12.

14. An aircraft system of an aircraft, the aircraft system comprising at least one controller and a flight deck element, the at least one controller communicatively coupled with memory storing aircraft landing event data and configured to:
   determine an environmental condition representative of a condition of a runway approached by the aircraft;
   determine a retardation demand representative of a demand to slow the aircraft on the runway during an anticipated landing event of the aircraft on the runway;
   select, from the memory, a sub-set of aircraft landing event data comprising environmental conditions and retardation demands within a predetermined range of, respectively, the environmental condition and retardation demand determined by the controller;
   determine a performance indicator of the aircraft based on the aircraft landing event data selected by the controller before the aircraft performs the anticipated landing event; and
   control the anticipated landing event using the performance indicator, wherein the control includes causing the flight deck element to display the performance indicator,
   wherein the aircraft landing event data stored in the memory includes aircraft landing event data for a plurality of historical aircraft landing events, and the aircraft landing event data for each of the historical landing events includes data representing an environmental condition, a retardation demand and a performance indicator for the historical landing event;
   wherein the sub-set of the aircraft landing event data includes the aircraft landing event data for the historical landing events corresponding to at least one of:
   i. the runway being approached by the aircraft;
   ii. the environmental condition of the runway being approached by the aircraft, or
   iii. the retardation demand for the anticipated landing event;
   wherein the processor determines a relationship between the performance indicators and both the environment conditions and the retardation demands for the historical landing events in the sub-set of the aircraft landing event data selected by the processor, and
   wherein the determination of the performance indicator for the anticipated landing event uses the relationship to analyze the environmental information representative of the environmental condition of the runway being approached by the aircraft and the retardation information representative of the retardation demand of the aircraft during the anticipated landing event.

15. The aircraft of claim 1, wherein the performance indicator includes landing distance information indicative of a landing distance for the anticipated landing event and the landing system controlling the anticipated landing event includes applying the landing distance information to control the anticipated landing event.

16. The method of claim 12, wherein the performance indicator includes landing distance information indicative of a landing distance for the anticipated landing event and the landing system controlling the anticipated landing event includes applying the landing distance information to control the anticipated landing event.

17. The aircraft system of claim 14, wherein the performance indicator includes landing distance information indicative of a landing distance for the anticipated landing event and the control of the anticipated landing event includes applying the landing distance information to control the anticipated landing event.

* * * * *